March 9, 1937. O. SANDVIK 2,073,287
METHOD AND APPARATUS FOR REPRODUCING SOUND
Filed April 17, 1934
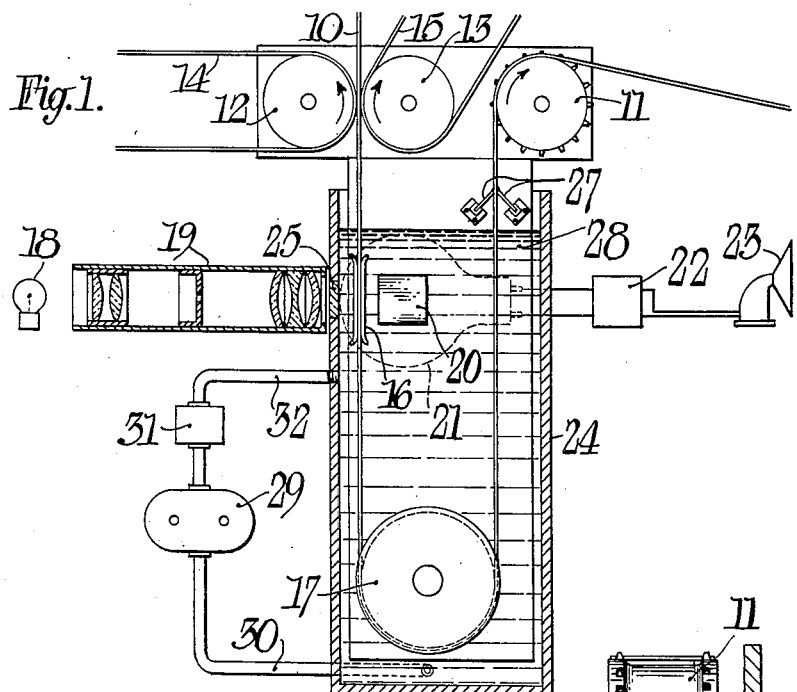
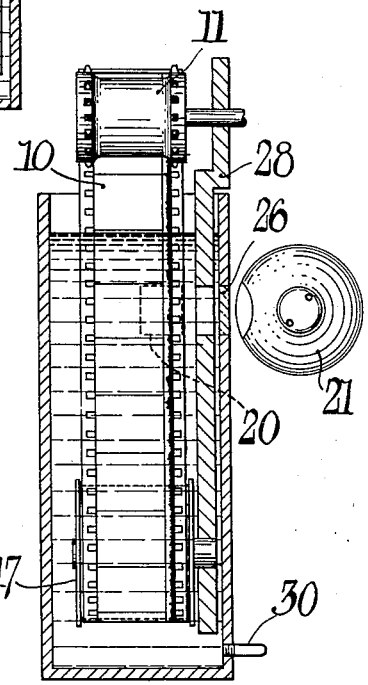
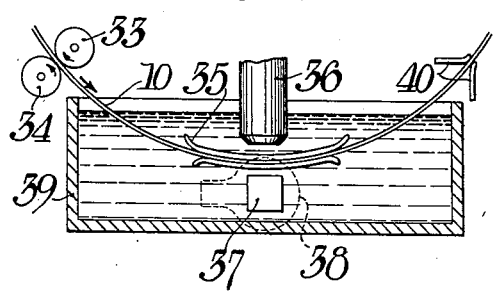
Inventor:
Otto Sandvik,
By Newton M. Pierce
Rolla X. Carter
Attorneys Patented Mar. 9, 1937

2,073,287

UNITED STATES PATENT OFFICE 2,073,287

METHOD AND APPARATUS FOR REPRODUCING SOUND

Otto Sandvik, Rochester, N. Y., assignor, by mesne assignments, to Eastman Kodak Company, Jersey City, N. J., a corporation of New Jersey Application April 17, 1934, Serial No. 720,997

4 Claims. (Cl. 179—100.3)

The present invention relates to the reproducing of sound with the aid of light and more particularly to the elimination of parasitic noise in photographic sound record reproduction.

The parasitic modulation or background noise generally present when sound is reproduced from a photographic record is primarily due to two causes, i. e. system noise arising in the photo-cell and vacuum tube amplifiers, and ground noise in the film due to aggregates of silver particles or other types of discrete structure in the image and surface conditions of the film such as dust, dirt, oil and scratches.

At present, scratches and other optical irregularities in the transparent carrier of the record such as the embossings used in certain color processes are the most serious source of parasitic modulation or noise and it is an object of this invention to eliminate or greatly reduce this source of noise.

In accordance with this invention the film is immersed in a liquid before and during the passage of the film past the sound aperture at which the record is translated into modulated light. This liquid will not only tend to free the film of oil and other foreign matter but will in effect render the surfaces of the film optically smooth if its refractive index approaches closely that of either the gelatine carrying the record or the transparent support. Inasmuch as the refractive indices of gelatine and ordinary commercial film base are substantially the same the liquid will serve equally well to reduce greatly the general scattering of light ordinarily caused by surface imperfections and irregularities in either the gelatine or the film base.

Of the very large number of liquids that would be suitable from an optical point of view, I prefer to select those which are volatile and without action on the emulsion or the base of the film or the mechanical parts of the projecting apparatus. It will be an advantage if the liquid is not inflammable. Of such liquids, I may use the simple chlorinated benzene hydrocarbons, my preferred liquid being carbon tetrachloride. To the carbon tetrachloride may be added proportions of light petroleum or benzene to produce a mixture that is not readily inflammable.

In its simplest form, a device for passing a narrow beam of light through film immersed in a liquid could comprise a means for producing a light beam, a transparent cell with optically plane sides for holding the liquid, and a means for immersing the film in the liquid in a continuous manner.

For a clearer understanding of the invention reference is made to the accompanying drawing in which Fig. 1 is a sectional elevation partly diagrammatic of one embodiment of the invention; Fig. 2 is a sectional side elevation partly diagrammatic of the apparatus shown in Fig. 1; and Fig. 3 is a sectional elevation partly diagrammatic of a modified arrangement for practicing the invention.

In the embodiment of the invention illustrated in Figures 1 and 2 there is shown a sound reproducing apparatus in which a film 10 bearing a sound record is withdrawn from any suitable supply reel (not shown) by the action of a sprocket 11, which may be driven in any suitable well known manner, and passes successively between rolls 12 and 13 provided with cleaning cloths 14 and 15, respectively, of flannel or other suitable material, a gate 16 provided with a suitable sound aperture, a film driven flanged guide roller 17, over the sprocket 11 and thence to any suitable take up device. A light source 18 and a lens tube 19 serve to focus a light beam of the desired narrowness on the film 10 in the gate 16. The light as modulated by the sound record on the film is directed by a reflecting prism 20 onto a light sensitive cell 21 the output of which is fed through an amplifier 22 to a loud speaker 23 which reproduces the sound as is well known.

The apparatus just described is merely a conventional scanning arrangement and it will be understood that any other well known arrangement may be used. In accordance with my invention the film at the scanning point is immersed in a liquid and this may be accomplished by means of a rectangular box 24 provided with two transparent sections 25 and 26, which may be plate glass, in the path of the light beam. The box 24 is filled to a convenient level with a suitable liquid, such as carbon tetrachloride, to surround the loop of film formed by the guide roller 17 and including the gate 16 at which the record is scanned. A pair of squeegees 27 mounted on a bracket 28 carried by the main sound head serve to remove excess liquid from the film as it emerges from the scanning bath. The bracket 28 also carries the cleaning rollers 12 and 13, the gate 16, reflector 20, guide roller 17 and the driven sprocket 11.

It may well be that the action of the cleaning cloths 14 and 15 will be insufficient to prevent the film from carrying so much dirt and suspended matter into the liquid that the latter may become opaque or contribute seriously to the noise level. I may therefore supply the scanning bath continuously with optically pure fluid but I prefer to filter the fluid and to this end I provide a suitable power driven pressure pump such as a gear pump 29 for withdrawing the fluid from the tank 24 through a pipe line 30, and forcing it through a suitable filter 31 contained in a pipe line 32 leading back into the tank 24. The points at which the fluid should be withdrawn from and returned to the tank after filtering to obtain the most efficient results will depend upon the convection currents set up by the moving film and the rotating guide roller 17 and in most cases will have to be determined experimentally.

The liquid in the tank 24, being by preference volatile, the small amount remaining on the film after passing through the squeegees 27 will rapidly evaporate and the film will be dry before being wound on the take up reel.

In Fig. 3 I have shown a modified arrangement in which the film 10 bearing the sound record is passed between two cleaning rolls 33 and 34, through a curved gate 35 at which the sound is taken off by means of a scanning arrangement including an optical system 36, reflector 37 and light cell 38. The film at the scanning point is immersed in a liquid contained in an elongated tank 39 and a pair of squeegees 40 are provided for removing the excess liquid from the film after it emerges from the fluid in the tank 39.

Although I have illustrated and described in detail two embodiments suitable for practicing my invention, it will be obvious to those skilled in the art that many equivalent arrangements may be employed utilizing the teachings of my invention and I intend to include all such arrangements within the scope of the appended claims.

What I claim as new and desire to secure by Letters Patent of the United States is:

1. In a sound head of the class described, a sound aperture, means for advancing a sound record film past said aperture, an illuminating system for forming a linear light image on the film in said aperture, a speaker system adapted to be energized by the light transmitted by the sound record film, and a liquid supported in intimate contact with the film in said aperture, said liquid having an index of refraction substantially equal to the refractive index of said film, whereby optical irregularities in the surface of the film do not affect the light transmitted to the speaker system.

2. The method of reducing parasitic noise in the reproduction of sound from a photographic record carried by a transparent support which comprises physically removing loose particles from the record and support, immersing the record and support in a liquid having a refractive index substantially equal to the refractive index of the support to fill in the irregularities in the surface of the support and translating the record into modulated light while the record is immersed in the liquid.

3. Apparatus for reproducing a sound record film comprising a container, a liquid in the container having a refractive index substantially equal to the refractive index of the film, a guide roller supported in the container for holding a loop of the film submerged in the liquid, means for guiding the film to said roller, means for withdrawing the film from said roller and from said container, squeegee means for removing excess liquid from the film after it emerges from the liquid and means for translating said record into modulated light at a point within the body of the liquid, whereby optical irregularities in the film do not affect the modulated light.

4. The method of reducing the surface noise in reproducing sound from a photographic record carried by a transparent support provided on one of its surfaces with lenticular embossings, which comprises advancing said record between a source of light and a light sensitive element to modulate the light falling on said element, and optically removing said embossings during the time said record is modulating said light.

OTTO SANDVIK.